United States Patent
Estelle

(10) Patent No.: US 12,115,551 B2
(45) Date of Patent: Oct. 15, 2024

(54) SYSTEMS AND METHODS OF CONTROLLING ADHESIVE APPLICATION

(71) Applicant: NORDSON CORPORATION, Westlake, OH (US)

(72) Inventor: Peter W. Estelle, Norcross, GA (US)

(73) Assignee: Nordson Corporation, Westlake, OH (US)

( * ) Notice: Subject to any disclaimer, the term of this patent is extended or adjusted under 35 U.S.C. 154(b) by 0 days.

(21) Appl. No.: 17/960,288

(22) Filed: Oct. 5, 2022

(65) Prior Publication Data
US 2023/0021607 A1    Jan. 26, 2023

Related U.S. Application Data

(63) Continuation of application No. 15/790,210, filed on Oct. 23, 2017, now Pat. No. 11,618,051.

(60) Provisional application No. 62/414,793, filed on Oct. 30, 2016.

(51) Int. Cl.
| | |
|---|---|
| *B05C 11/10* | (2006.01) |
| *B05C 5/00* | (2006.01) |
| *B05C 5/02* | (2006.01) |
| *C09J 5/00* | (2006.01) |

(52) U.S. Cl.
CPC ...... *B05C 11/1042* (2013.01); *B05C 11/1002* (2013.01); *B05C 11/1005* (2013.01); *B05C 5/001* (2013.01); *B05C 5/0208* (2013.01); *C09J 5/00* (2013.01)

(58) Field of Classification Search
None
See application file for complete search history.

(56) References Cited

U.S. PATENT DOCUMENTS

| | | | |
|---|---|---|---|
| 3,887,110 | A | 6/1975 | Porter |
| 4,531,525 | A | 7/1985 | Richards |
| 4,531,535 | A | 7/1985 | Kiernan et al. |
| 6,857,441 | B2 | 2/2005 | Flavelle |

(Continued)

FOREIGN PATENT DOCUMENTS

| | | |
|---|---|---|
| CN | 102971086 A | 3/2013 |
| CN | 103537408 A | 1/2014 |

(Continued)

OTHER PUBLICATIONS

European Patent Application No. 17199138.3; Extended Search Report; dated Apr. 5, 2018; 10 pages.

(Continued)

*Primary Examiner* — David Earl Ogg
(74) *Attorney, Agent, or Firm* — BakerHostetler

(57) ABSTRACT

Systems and methods for controlling adhesive application are disclosed. The systems and methods may include a controller and one or more sensors configured to measure an amount of adhesive applied to a plurality of substrates by a pump, detect a number of the substrates, determine an amount of adhesive applied per substrate, compare the adhesive applied per substrate to a target value, and adjust a pressure of the pump based on the comparison. The sensor(s) may include one or more of a valve sensor coupled to an adhesive supply, a flow rate sensor coupled to a manifold, a flow rate sensor coupled to one or more hoses, and a flow rate sensors coupled to a gun.

19 Claims, 3 Drawing Sheets

(56) References Cited

U.S. PATENT DOCUMENTS

| | | | |
|---|---|---|---|
| 7,311,004 B2 | 12/2007 | Giles | |
| 9,044,037 B2 | 6/2015 | Ream et al. | |
| 11,041,745 B2 | 6/2021 | Fort et al. | |
| 2003/0148018 A1* | 8/2003 | Hoffmann | B05C 11/1023 427/8 |
| 2005/0230423 A1* | 10/2005 | Riney | B05C 11/1042 156/578 |
| 2006/0096530 A1 | 5/2006 | Klein | |
| 2007/0231434 A1 | 10/2007 | Ream et al. | |
| 2009/0038707 A1* | 2/2009 | Gaon | B05C 11/1023 141/1 |
| 2010/0209592 A1* | 8/2010 | Wanthal | B05B 15/72 427/8 |
| 2012/0259448 A1 | 10/2012 | Rzonca et al. | |
| 2013/0123975 A1 | 5/2013 | Duckworth | |
| 2014/0014683 A1* | 1/2014 | Owen | B05C 11/1044 222/54 |
| 2014/0014686 A1* | 1/2014 | Bacco | B05C 11/1044 222/63 |
| 2014/0076923 A1* | 3/2014 | Clark | B05C 11/1042 73/304 C |
| 2016/0008834 A1* | 1/2016 | Brudevold | F04B 53/10 417/46 |
| 2017/0284844 A1 | 10/2017 | Fort et al. | |
| 2021/0285804 A1 | 9/2021 | Fort et al. | |

FOREIGN PATENT DOCUMENTS

| | | | | |
|---|---|---|---|---|
| DE | 29620763 U1 | 2/1997 | | |
| DE | 10141676 A1 | 6/2002 | | |
| EP | 2404679 A1 | 1/2012 | | |
| EP | 2684614 A1 | 1/2014 | | |
| JP | 2009-542430 A | 12/2009 | | |
| JP | 2013-538672 A | 10/2013 | | |
| JP | 2014-018798 A | 2/2014 | | |
| JP | 2014-018799 A | 2/2014 | | |
| WO | 2011/084727 A2 | 7/2011 | | |
| WO | 2016/010597 A1 | 1/2016 | | |
| WO | WO-2016061443 A1 * | 4/2016 | | B05B 12/00 |

OTHER PUBLICATIONS

Observations by third parties Mailed on Dec. 30, 2022 for EP Application No. 17199138.

"Third party objections to the patent in dispute EP3315211", Nov. 2, 2019, 12 pages (Contains English Machine Translation).

Observations by third parties Mailed on Jan. 13, 2023 for EP Application No. 17199138.3, pp. 8.

* cited by examiner

SYSTEMS AND METHODS OF CONTROLLING ADHESIVE APPLICATION

CROSS REFERENCE TO RELATED APPLICATIONS

This application is a continuation of U.S. patent application Ser. No. 15/790,210, filed Oct. 23, 2017, which claims the benefit of U.S. Provisional Patent App. No. 62/414,793, filed Oct. 30, 2016, the entire disclosures of both of which are hereby incorporated by reference as if set forth in their entirety herein.

TECHNICAL FIELD

The present disclosure relates generally to systems and processes for controlling adhesive application, and more particularly, to systems and processes for controlling adhesive application in a closed loop based on an amount of adhesive applied per substrate.

BACKGROUND

The amount of adhesive applied to a substrate is often critical. For example, ensuring that a proper amount of adhesive is applied to packaging may substantially affect the sale of a packaged good. On one hand, applying too much adhesive to the packaging may increase the cost of the packaged good, while also possibly reducing the aesthetics by having the adhesive "squeeze-out" of joints. On the other hand, applying too little adhesive may compromise the integrity of the packaging, possibly causing damage to the packaged goods. Even a few of these deficiencies may cause an entire production run of products to be rejected by a prospective buyer. Current systems do not provide sufficient control in applying adhesive to substrates. Therefore, it would be desirable to provide a closed loop system configured to control adhesive application based on the application rate and the number of substrates.

SUMMARY

The foregoing needs are met, to a great extent, by the systems and processes described herein. One aspect of the present disclosure is directed to a process. The process may include measuring an amount of adhesive applied to a plurality of substrates by a pump, detecting a number of the substrates, determining an amount of adhesive applied per substrate, comparing the adhesive applied per substrate to a target value, and adjusting a pressure of the pump based on the comparison.

Another aspect of the present disclosure is directed to a control system for controlling adhesive application including a first sensor configured to measure an amount of adhesive applied to a plurality of substrates by a pump, a second sensor configured to detect a number of the substrates, and a controller in communication with the first sensor and the second sensor. The controller configured to determine an amount of adhesive applied per substrate based, compare the adhesive applied per substrate to a target value, and adjust a pressure of the pump based on the comparison.

Yet another aspect of the present disclosure is directed to a non-transitory computer-readable medium storing instructions which, when executed, cause one or more processors to perform a process for controlling adhesive application. The process may include measuring an amount of adhesive applied to a plurality of substrates by a pump, detecting a number of the substrates, determining an amount of adhesive applied per substrate, comparing the adhesive applied per substrate to a target value, and adjusting a pressure of the pump based on the comparison.

BRIEF DESCRIPTION OF THE DRAWINGS

In order that the disclosure may be readily understood, aspects of this disclosure are illustrated by way of examples in the accompanying drawings.

The same reference numbers are used in the drawings and the following detailed description to refer to the same or similar parts.

DETAILED DESCRIPTION

A hot melt adhesive system 10 may be configured to provide convenience and understanding to the user and quality control personnel by enabling control of the amount of adhesive applied per substrate. The hot melt adhesive system 10 may use sensors and controls to totalize adhesive consumption and detect the number of substrates. The hot melt adhesive system 10 may be configured to apply a consistent amount of adhesive (e.g., "add-on" weight or volume) to the substrate(s). The hot melt adhesive system 10 may be configured to receive a target adhesive applied per substrate and continuously control components accordingly. Therefore, the hot melt adhesive system 10 may ensure sufficient adhesive is applied, while increasing the economics and aesthetics of adhesive application by reducing waste.

It will be appreciated that the hot melt adhesive system 10 shown and described herein is merely exemplary, and that the control of the amount of adhesive applied per substrate is applicable to other hot melt adhesive systems. For example, the hot melt adhesive system 10 includes a separated hopper and melter, but could be a hot melt adhesive system that includes a grid and reservoir melter. The hot melt adhesive system 10 may apply adhesive to any type of substrate, such as packaging (e.g., boxes, envelopes), electronics (e.g., semi-conductors, circuit boards), hygienic, industrial, consumer goods, and/or paper products. Furthermore, although discussed with regard to adhesives, the adhesive system 10 may also be configured to apply a number of other materials, such as food products.

Figure 1:
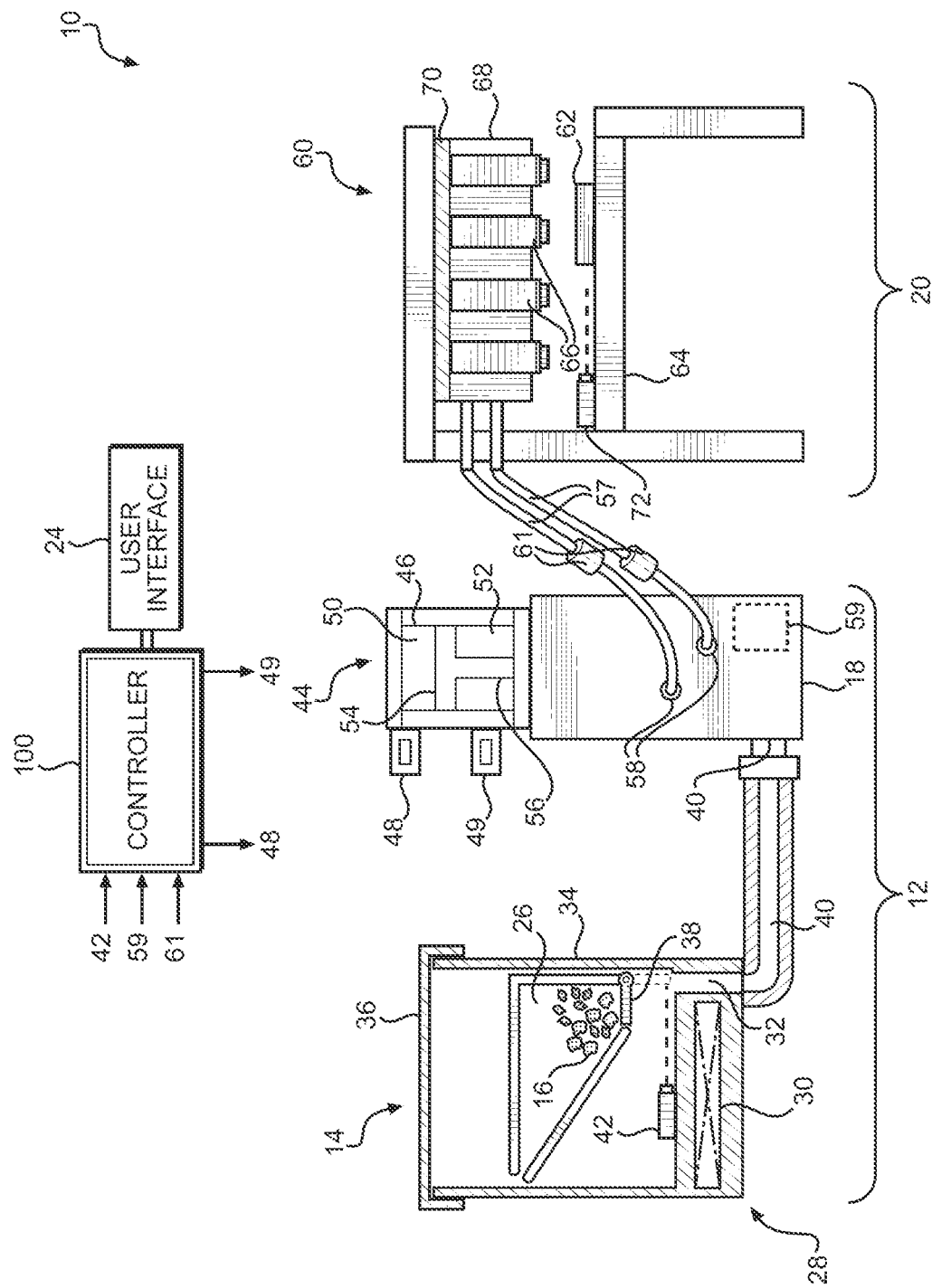
FIG. 1 illustrates an exemplary diagrammatic view of a hot melt adhesive system.

Referring to FIG. 1, the hot melt adhesive system 10 may include a dispensing unit 12 and an application unit 20. The dispensing unit 12 may further include an adhesive supply 14 configured to receive and melt solid or semi-solid hot melt adhesive material 16, a manifold 18 connected to the adhesive supply 14, and a pump 44 configured to propel the adhesive material 16. The operation of the dispensing unit 12 and/or the application unit 20 may be controlled and operated by a controller 100 and/or a user interface 24.

The adhesive supply 14 may include a hopper 26 configured to contain the adhesive material 16 when in the solid or semi-solid state, and a melter 28 having a heating element 30 and a reservoir 32, such that the heating element 30 is configured to melt the adhesive material 16 when contained in the reservoir 32. In other implementations, the adhesive supply 14 may not include the heating element 30, which may instead be in the manifold 18. The adhesive supply 14 may also include one or more side walls 34 and a removable cover 36 configured to contain the hopper 26. The hopper 26 may also include a valve 38 configured to selectively enable passage of the adhesive material 16 into the reservoir 32. The reservoir 32 may be coupled to a rigid or flexible flow path 40 that enables passage of the melted adhesive material 16 to the manifold 18. The rigid or flexible flow path 40 may have minimal or near zero length. In some embodiments, the adhesive supply 14 may further include a valve sensor 42 configured to detect an amount of adhesive material 16 transported to the manifold 18 through interaction with the valve 38. For example, in some embodiments, the valve sensor 42 may be an optical sensor configured to detect a break in an optical beam induced by the opening of the valve 38. The valve sensor 42 may, additionally or alternatively, be inductive, capacitive, a mechanical micro switch, etc. Accordingly, the amount of applied adhesive material 16 may be determined based on the detected opening of the valve 38 and a known quantity of the adhesive material 16 passing through the valve 38 per opening.

The manifold 18 may be mounted to the side wall 34 of the adhesive supply 14 and may be coupled to a pump 44. The pump 44 may be configured to pump liquid hot melt adhesive material 16 from the adhesive supply 14 and into the manifold 18 where it is split into separate flows. In some embodiments, the pump 44 may include a housing 46 defining a piston chamber that receives a piston 54. A pump rod 56 may extend downwardly from the piston 54 into the manifold 18 to pressurize the adhesive material 16. The piston 54 may divide the piston chamber into an upper chamber 50 and a lower chamber 52. The upper chamber 50 may selectively receive pressurized air from a first actuator 48, and the lower chamber 52 may selectively receive pressurized air from the second actuator 49. Therefore, the first and second actuators 48, 49 may be alternatively actuated to provide pressurized air in the upper chamber 50 to push on an upper side of the piston 54 to move the piston 54 and pump rod 56 in one direction, and then to provide pressurized air in the lower chamber 52 to push on a lower side of the piston 54 to move the piston 54 and the pump rod 56 in another direction. This reciprocating movement of the pump rod 56 may repeatedly draw adhesive material 16 into the manifold 18 from the adhesive supply 14 and expel the adhesive material 16 out of the manifold 18. The piston 54 and/or the pump rod 56 may include one or more sensors (not shown) to determine material flow rate. The actuators 48, 49 may include solenoids, spool valves, and/or any other type of actuator configured to provide the pressurized air. In some embodiments, the pump 44 may, alternatively, be actuated by one or more magnetic shifters. Although described as a piston pump, pump 44 may embody any type of pump including an air piston pump or a motor controlled pump.

In some embodiments, the pump 44 may include or be coupled to an air-piloted voltage-to-pressure or current-to-pressure device to control air pressure to the pump 44, such that hydraulic output pressure may be proportional to input air pressure. In some embodiments, the pump 44 may include a pressure control valve in a re-circulation path parallel to the output path, such that the pressure control valve may be modulated with either air or electrically. In some embodiments, a pressure reducing regulator may be directly in line with the output flow path providing a substantially constant pressure source.

The manifold 18 may include one or more ports 58 that create flow streams of the adhesive material 16. The manifold 18 may also include a flow sensor 59 for measuring the flow rate of the liquid hot melt adhesive material 16 therethrough. The flow sensor 59 may generate a signal indicative of flow rate information. For example, the flow sensor 59 may be an encoder that measures the rotation of a shaft in the manifold 18 that a flow of liquid hot melt adhesive material 16 causes to rotate. The flow sensor 59 may, additionally or alternatively, be at an outlet of the manifold 18, and the flow sensor 59 may include a plurality of ports for attachment to the hoses 57. Exemplary manifolds including a flow sensor suitable for the present are disclosed in U.S. Pat. No. 6,857,441 and U.S. Provisional Patent App. No. 62/318,114 filed Apr. 4, 2016, the disclosures of which are incorporated by reference herein. Other manifolds, flow sensors, or flow rate measuring devices, may be used, and the specific form of the manifold 18 and the flow sensor 59 discussed herein provide an exemplary illustration only. In addition, a pressure sensor may also be used in place of or in conjunction with the flow sensor 59. The flow sensor 59 is part of a control system associated with the pump 44, as will be discussed.

The one or more ports 58 of the manifold 18 may be fitted with hoses 57 connected to the application unit 20. The hoses 57 may be fitted with one or more flow sensors 61 configured to generate a signal based on flow rate information. The flow sensors 61 may be positioned in-line with the hoses 57. For example, the system 10 may include a plurality of small flow sensors 61 in-line with each of the hoses 57. In some embodiments, the flow sensors 61 may include a rotary encoder positioned inside of the hoses 57 and may be configured to generate a signal based on the rate of fluid flow of the adhesive material 16. In some embodiments, the flow sensors 61 may be positioned outside the hoses 57 (e.g., as depicted in FIG. 1) and configured to measure flow rate through laser-based interferometry and/or the Doppler-based measurements and generate a signal.

The application unit 20 may include one or more adhesive guns 60 configured to apply the adhesive material 16 to a substrate 62 positioned on a support 64. In some embodiments, the application unit 20 may include a conveyor (e.g., a conveyor belt) configured to convey one or more substrates 62 through the stream of the guns 60. The conveyor may be controlled through a signal from the controller 100. The guns 60 may include one or more adhesive dispensing modules 66 mounted to gun bodies 68 having gun heaters 70 and on the support 64. The adhesive dispensing modules 66 of the guns 60 may provide a nozzle through which the adhesive material 16 is dispensed. In some embodiments, one or more flow sensor(s) may be positioned in and/or on the guns 60 and configured to generate a signal based on flow rate information of the applied adhesive material 16. For example, the flow sensor(s) of the guns 60 may be configured to detect the flow rate of the adhesive material 16 into the gun 60, through the gun 60, and/or out of the nozzle(s), and/or the size of the nozzle(s). The flow sensor(s) may be positioned at an inlet of the gun(s) 60 and/or at each of the nozzle(s) depending on the desired precision.

The application unit 20 may include one or more substrate sensors 72 configured to detect the number of substrates 62 that are conveyed on the support 64 and/or applied with the adhesive material 16. In some embodiments, the substrate sensor 72 may have structure similar to the valve sensor 42, such as an optical sensor configured to detect a break in an optical beam induced by the passage of the substrate 62. It is also contemplated that the substrate sensor 72 may include a weight sensor configured to detect passage of the substrate 62 based on the weight applied to the substrate sensor 72.

Although the hot melt adhesive system 10 is depicted in FIG. 1 as including a single application unit located adjacent a single dispensing unit 12, different numbers of dispensing units 12, application units 20, and adhesive guns 60 may be used in any configuration.

Figure 2:
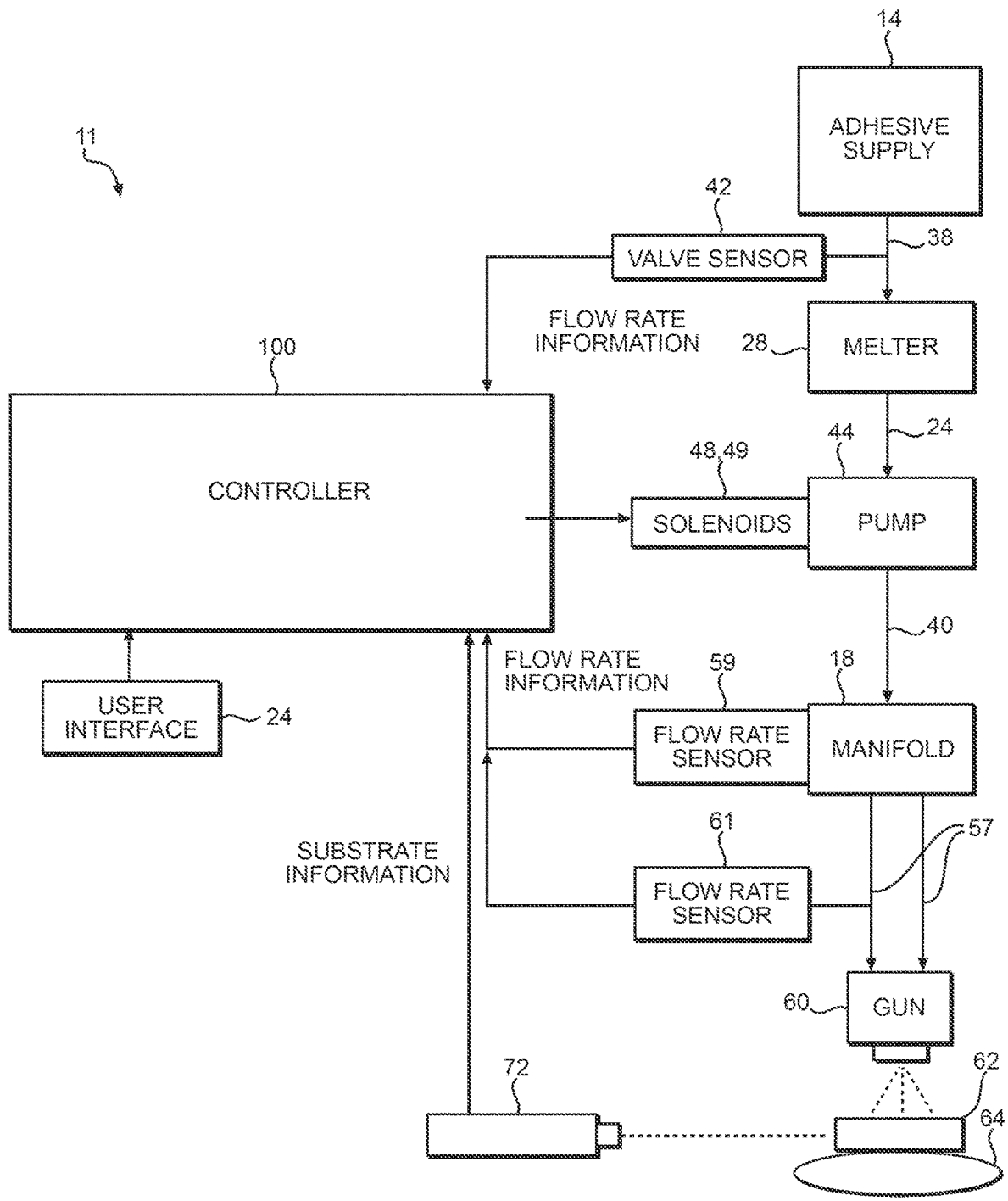
FIG. 2 illustrates an exemplary schematic view of a control system that may be used with the exemplary hot melt adhesive system of FIG. 1.

FIG. 2 illustrates an exemplary schematic view of a control system 11 that may be included in the exemplary hot melt adhesive system 10 of FIG. 1. The control system 11 may include one or more of the controllers 100 in communication with one or more sensors and/or actuators. For example, the controller 100 may be in wired and/or wireless communication with the user interface 24, the valve sensor 42, the actuators 48, 49, one or more of the flow sensors 59, 61, and/or the substrate sensor 72. The controller 100 may include one or more computers, servers, modules, and/or programmable circuits that receives the various sensor inputs and produces a control signal, for example, to control the pump 44 through the actuators 48, 49. The controller 100 may also be configured to receive target application settings of the adhesive material 16 (e.g., through user interface 24) or store preset application settings of the adhesive material 16, and control the pump 44 based on the target application settings in a closed loop. For example, the controller 100 may be configured to receive a target amount of the adhesive material 16 applied to each substrate 62. The controller 100 may be realized in many different forms and configurations, including but not limited to a programmable microcontroller, a PLC, discrete circuit components, and ASIC-type controllers to execute an appropriate control algorithm, for example a closed loop PID control method.

The controller 100 may receive flow rate information from one or more of the sensors. For example, in some embodiments, the control system 11 may include the flow sensor 59 for measuring the flow rate of the liquid hot melt adhesive material 16 through the manifold 18. The control system 11 may, additionally or alternatively, include other sensors to detect flow rate information, such as the valve sensor 42 configured to detect the opening/closing of the valve 38, which may be processed to determine the flow of adhesive material 16 into the melter 28. The control system 11 may include the flow sensor 61 configured to detect the flow of the adhesive material 16 through one or more of the hoses 57 to the guns 60. The control system 11 may further include the flow sensor operatively connected to the guns 60 and configured to detect the adhesive material 16 flowing from the guns 60 onto one or more substrates 62. The detected flow rate information of the adhesive material 16 may include flow rate, pressure, temperature, and/or viscosity. The flow sensor operatively connected to the gun 60 may further detect nozzle size of the gun 60. The flow rate information may be received and processed by the controller 100 in order to execute control signals.

The controller 100 may also receive substrate information from the substrate sensor 72. The substrate sensor 72 may be configured to detect the substrates 62 that pass through the support 64, for example, by way of a conveyor belt. The substrate information may include the number, the size, and/or the type of the substrate 62 and may be used to determine the amount of adhesive material 16 applied to reach the target adhesive per substrate. For example, the more substrates 62 passing through the support 64 may require more adhesive material 16 to be applied. Furthermore, the larger substrates 62 may require additional adhesive material 16. The substrate sensor 72 may be positioned and/or configured to detect application areas of the substrates 62. For example, if the adhesive system 10 is intended to apply the adhesive material 16 to a seam of the substrate (such as a box), the substrate sensor 72 may be configured to measure the length of the seam to determine the amount of adhesive material that needs to be applied to the seam. The substrate sensor 72 may generate a signal to the controller 100 indicative of the substrate information.

The controller 100 may also generate control signals to the actuators 48, 49 associated with the pump 44. The controller 100 may hydraulically, mechanically, magnetically and/or electrically change the operating state of the actuators 48, 49, which controls the rate at which the pump 44 advances liquid hot melt adhesive material 16 through the hot melt adhesive system 10.

The controller 100 may be configured to perform machine control and includes features for starting, stopping, and controlling aspects of pumping in the hot melt adhesive system 10. Particularly, the controller 100 may receive and/or generate various control information, such as target information relating to a target adhesive per substrate for the control system 11. For example, the adhesive applied per substrate may depend on a number of aspects of the flow rate information (e.g., flow rate, pressure, temperature, and/or viscosity of the adhesive material 16) and the substrate information (e.g., quantity and size of the substrates 62). Accordingly, the controller 100 may detect each of these aspects through the sensors and determine how the aspects affect the adhesive per substrate 62. The controller 100 may compare the information of the actual flow rate to the targeted adhesive per substrate 62. In response, the controller 100 may send control signals to control the actuators 48, 49 to operate at a pump speed associated with the target adhesive applied per substrate.

The controller 100 may also be associated with the user interface 24 for providing a user with information about, and control over, pumping functions of the hot melt adhesive system 10. The user interface 24 may present information to the user relating to adhesive flow rate, motor speed, and other pumping-related parameters of the hot melt adhesive system 10. The user interface 24 may provide controls for the user to adjust pumping-related parameters of the hot melt adhesive system 10. In some embodiments, the user interface 24 may be configured to receive the target adhesive applied per substrate 62 or other control information from the user. For example, the user interface 24 may receive a target of one gram of the adhesive material 16 applied per substrate 62. The user interface 24 may then generate a signal to the controller 100, where it is processed to determine the required speed of the adhesive material 16 and corresponding pressure of the pump 44. The controller 100 may also factor in flow rate information (e.g., pressure, temperature, viscosity, and/or nozzle size) and substrate information (e.g., the speed of the conveyor of the support 64 to determine the exposure of the substrates 62 to the adhesive material 16). The controller 100 may then generate control signals to the actuators 48, 49 to control the pump 44.

In addition to receiving the measured flow rate information from the flow sensors 59, 61 and the controller 100 is configured to compare the measured flow rate information with the control information. In response to this comparison, the controller 100 may generate and implement motor control instructions or otherwise controls or adjusts the actuators 48, 49, such as by controlling the frequency or voltage of the electrical power supplied thereto. In turn, the pump 44 may be controlled or adjusted so as to cause a flow rate of the adhesive material 16 (e.g., as measured by one of the flow sensor 59, 61) that corresponds to the target adhesive applied per substrate 62 associated with the control instructions. By continuously measuring the flow rate of liquid hot melt adhesive material 16 and by continuously adjusting the pump 44 (through the actuators 48, 49) in view of the measured flow rate information, a closed-loop adhesive flow rate feedback system is provided.

By implementing a closed-loop feedback system into the control system 11 as disclosed herein, a separate auxiliary controller for collecting flow rate information and for communicating with other control components of a hot melt adhesive system may not be used. Rather, the flow rate information gathered by the flow sensor is provided directly to the controller 100, which controls the pump actuators 48, 49, thereby providing a closed-loop feedback system. In addition to reducing the number of components in the adhesive system 10, the disclosed control system 11 and arrangement reduces the cost of an adhesive dispensing system as compared with one that uses a separate auxiliary controller housed in components separate from the principal components of the hot melt adhesive system. Moreover, by eliminating a separate auxiliary controller, the number of devices used in the closed-loop feedback system is reduced, and therefore the lag time between the when flow rate measurements are collected and when the pump or pump motor is adjusted is reduced.

Figure 3:
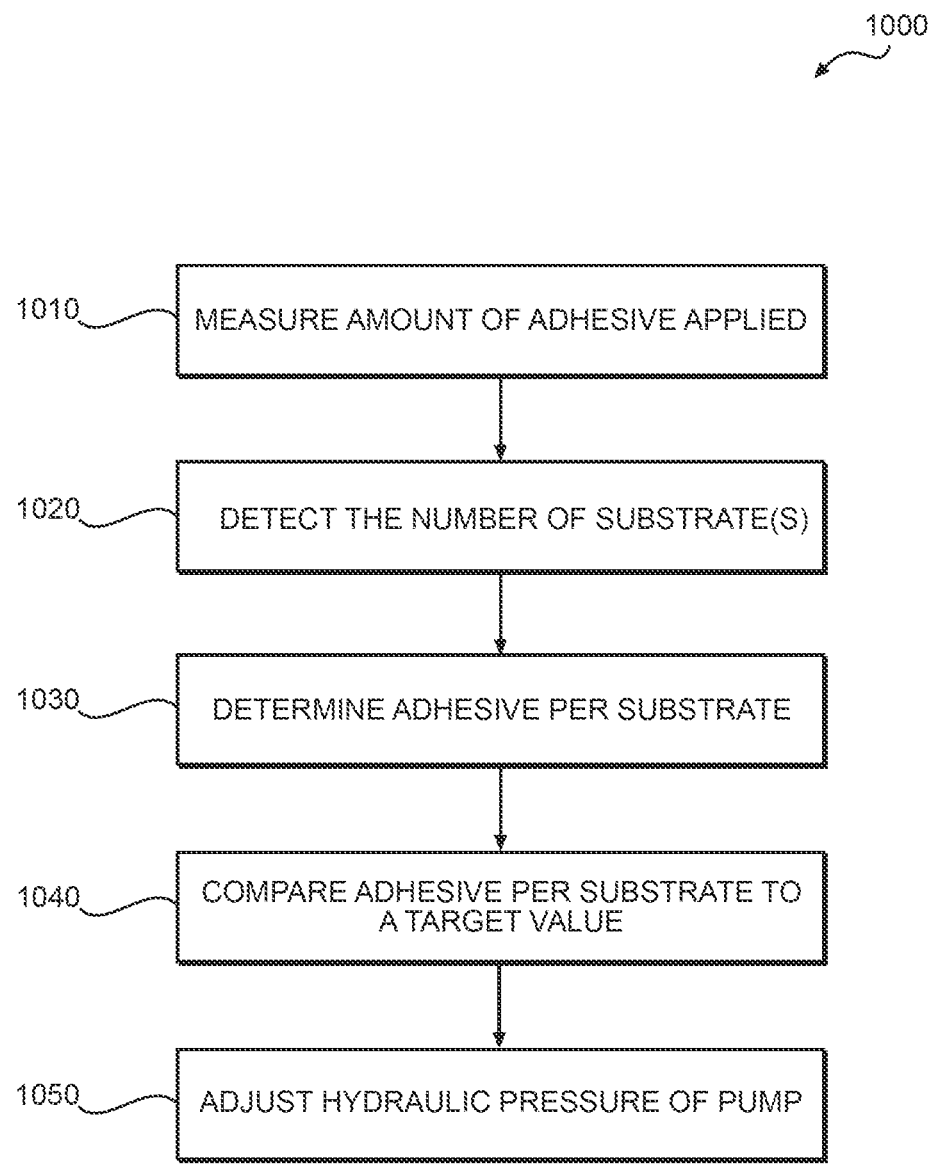
FIG. 3 illustrates an exemplary process of controlling an application of adhesive that may be performed by the exemplary control system of FIG. 2.

FIG. 3 illustrates an exemplary process 1000 of controlling an application of adhesive that may be performed by the exemplary control system 11 of FIG. 2. Although the process 1000 is discussed as being performed by the controller 100, it is contemplated that one or more of the steps of the process 1000 may be performed by other components of the control system 11.

In step 1010, the controller 100 may measure the amount of adhesive material 16 being applied. For example, the controller 100 may measure the amount of adhesive material 16 applied through receiving signals through one or of the valve sensor 42 and/or flow sensors 59, 61. For example, the valve sensor 42 may detect the fill cycle through the number of times the valve 38 of the hopper 26 opens/closes and generate a signal to the controller 100. The controller 100 may then correlate the signal to the amount of adhesive material 16 passing to the reservoir 32 of the melter 28. The controller 100 may also measure the amount of the adhesive material 16 applied by receiving a signal from one or more of the flow sensors 59, 61. The controller 100 may also totalize the applied adhesive material 16 based on the flow rate and time period of application. Step 1010 may also include detecting additional flow rate information of the adhesive material 16, such as pressure, temperature, viscosity, and/or nozzle size. It is contemplated that the various sensors may provide redundant flow rate information to the controller 100 in order to ensure accuracy.

In step 1020, the controller 100 may measure the product count of the substrates 62. For example, the substrate sensor 72 may measure the number of substrates 62 that pass on a conveyor belt of the support 64 over a desired time period. The substrate sensor 72 may generate an optical beam and detect a break in the optical beam as the substrates 62 pass along the conveyor belt. In some embodiments, step 1020 may further include detecting the size of each of the substrates and/or application areas using, for example, a camera and/or laser.

In step 1030, the controller 100 may determine the adhesive applied per substrate 62. For example, the controller 100 may determine the total amount of applied adhesive material 16 applied over a period of time, and compare the total amount the number of substrates 62 that passed on the conveyor belt over the same time. The determination of step 1030 may be based on a number of aspects of the flow rate information (e.g., flow rate, pressure, temperature, and/or viscosity of the adhesive material 16) and the substrate information (e.g., quantity and size of the substrates 62). The controller 100 may also factor in an amount of the adhesive material 16 that may be wasted in the dispensing process, for example, by comparing projection of the stream of the adhesive material 16 to the size of the substrate 62.

In step 1040, the controller 100 may compare the adhesive applied per substrate 62 to a target amount. For example, the target amount may be inputted by a user into the user interface 24. The target amount may, additionally or alternatively, be received remotely from another device, such as a PLC or a server. If the detected adhesive applied per substrate does not match the target amount, the controller 100 may proceed to step 1050.

In step 1050, the controller 100 may adjust the pressure of the pump based on the comparison. For example, if the detected adhesive applied per substrate is lower than the target amount, the controller 100 may increase the driving pressure created by the actuators 48, 49 of the hydraulic pump 44, which may cause the piston 54 to reciprocate faster. On the other hand, if the detected adhesive applied per substrate is higher than the target amount, the controller 100 may decrease the driving pressure created by the actuators 48, 49 of the hydraulic pump 44, which may cause the piston 54 to reciprocate slower. The actuation of the actuators 48, 49 may be controlled by a stepper motor or other type of actuator. If the pump is pneumatic, the controller 100 may adjust the air pressure of the pump. The controller 100 may additionally or alternatively generate an output to the user interface 24 observable by the user. For example, the output may indicate to the user to add more adhesive material 16 to increase the viscosity of the adhesive material 16 and/or the adhesive applied per substrate 62.

Computer programs based on the written description and methods of this specification are within the skill of a software developer. The various programs or program modules can be created using a variety of programming techniques. For example, program sections or program modules can be designed in or by means of Java, C, C++, assembly language, or any such programming languages. One or more of such software sections or modules can be integrated into a computer system, non-transitory computer-readable media, or existing communications software. The computer programs may be read and executed by a processor of the controller 100.

Moreover, while illustrative embodiments have been described herein, the scope includes any and all embodiments having equivalent elements, modifications, omissions, combinations (e.g., of aspects across various embodiments), adaptations or alterations based on the present disclosure. Further, the steps of the disclosed methods can be modified in any manner, including by reordering steps or inserting or deleting steps.

What is claimed is:

1. A method for controlling adhesive application, the method comprising:
    melting solid or semi-solid adhesive with a melter;
    pumping, with a pump, the melted adhesive to an applicator for application onto a plurality of substrates;
    detecting a flow rate of the adhesive;
    detecting a number of the plurality of substrates and an application area of the plurality of substrates, wherein a dimension of the application area is measured prior to applying an amount of adhesive to the application area;

determining the amount of adhesive applied per substrate, wherein the adhesive is applied based on the application area;

comparing the adhesive applied per substrate to a target value with a controller; and adjusting a pressure of the pump based on the comparison with the controller.

2. The method of claim 1, pumping, with the pump, the melted adhesive through a manifold to an applicator for application onto a plurality of substrates.

3. The method of claim 2, wherein the detecting the flow rate of the adhesive comprises detecting the flow rate of the adhesive with a flow sensor in the manifold.

4. The method of claim 1, wherein measuring the amount of adhesive applied further includes detecting opening of a valve of a supply.

5. The method of claim 3, wherein the flow sensor is arranged in a hose in communication with the applicator.

6. The method of claim 1, wherein detecting the number of the substrates includes detecting the number of the substrates on a conveyor belt passing a substrate sensor.

7. The method of claim 1, further comprising receiving the target value with a user interface.

8. The method of claim 1, wherein the detecting the flow rate of the adhesive comprises detecting the flow rate of the adhesive with a flow sensor.

9. The method of claim 1, wherein the determining the amount of adhesive applied per substrate comprises determining the amount of adhesive applied per substrate based on the number of the plurality of substrates and the detected flow rate of the adhesive, and wherein the dimension of the application area includes a length, of the application area, that is measured prior to applying the amount of adhesive to the application area.

10. A control system for controlling adhesive application, the system comprising:
a supply containing solid or semi-solid adhesive;
a melter configured to melt the solid or semi-solid adhesive;
an applicator;
a pump configured to pump the melted adhesive to the applicator for application onto a plurality of substrates;
a flow sensor configured to detect a flow rate of the adhesive;
a substrate sensor configured to detect a number of the plurality of substrates and an application area of the plurality of substrates, wherein the substrate sensor is configured to measure a dimension of the application area prior to an amount of adhesive being applied to the application area;
a controller in communication with the flow sensor and the substrate sensor, the controller being configured to:
determine the amount of adhesive applied per substrate, wherein the adhesive is applied based on the application area;
compare the adhesive applied per substrate to a target value; and
adjust a pressure of the pump based on the comparison.

11. The system of claim 10, further comprising a manifold.

12. The system of claim 10, further comprising a sensor configured to detect opening of a valve of the supply to measure the amount of the adhesive applied.

13. The system of claim 10, further comprising a flow sensor positioned in a hose in communication with the applicator and configured to detect the flow rate in the hose.

14. The system of claim 10, wherein the substrate sensor is configured to detect the number of the substrates on a conveyor belt.

15. A non-transitory computer-readable medium storing instructions which, when executed, cause one or more processors to perform a process for controlling adhesive application, the process comprising:
melting solid or semi-solid adhesive with a melter;
pumping, with a pump, the melted adhesive to an applicator for application onto a plurality of substrates;
detecting a flow rate of the adhesive;
detecting a number of the plurality of substrates and an application area of the plurality of substrates, wherein a dimension of the application area is measured prior to applying an amount of adhesive to the application area;
determining the amount of adhesive applied per substrate, wherein the adhesive is applied based on the application area;
comparing the adhesive applied per substrate to a target value with a controller; and
adjusting a pressure of the pump based on the comparison with the controller.

16. The non-transitory computer-readable medium of claim 15, wherein measuring the amount of adhesive applied further includes detecting opening of a valve of a supply with a sensor.

17. The non-transitory computer-readable medium of claim 15, wherein the detecting the flow rate of adhesive comprises detecting the flow rate with a flow sensor in a hose that is in communication with the applicator.

18. The non-transitory computer-readable medium of claim 15, wherein detecting the number of the substrates includes detecting the number of the substrates on a conveyor belt passing a substrate sensor.

19. The non-transitory computer-readable medium of claim 15, wherein the determining the amount of adhesive applied per substrate is based on the number of the plurality of substrates and the detected flow rate of the adhesive, and wherein the dimension of the application area includes a length, of the application area, that is measured prior to applying the amount of adhesive to the application area.

* * * * *